W. P. Wood,
Scroll Sawing Machine,
Nº 14,339. Patented Feb. 26, 1856.
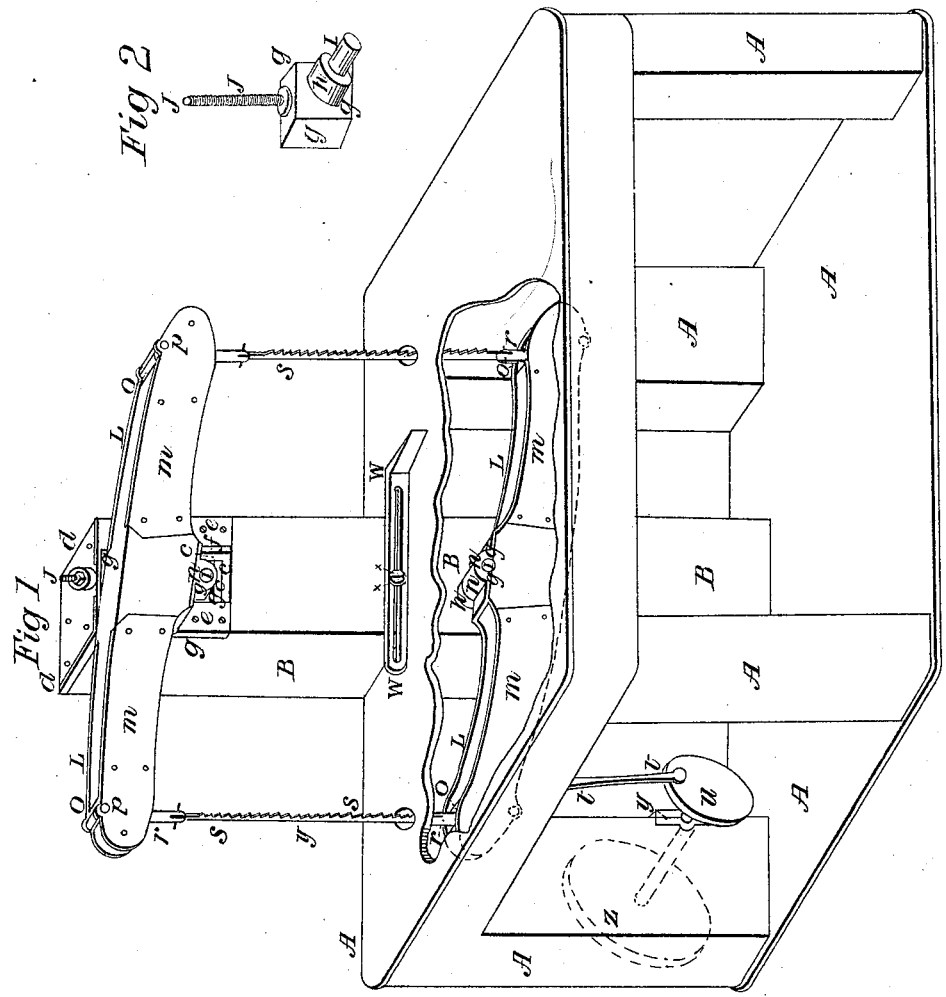

UNITED STATES PATENT OFFICE.

WILLIAM P. WOOD, OF WASHINGTON, DISTRICT OF COLUMBIA, ASSIGNOR TO W. P. WOOD AND JNO. S. GALLAHER, JR.

SAWING-MACHINE.

Specification of Letters Patent No. 14,339, dated February 26, 1856.

*To all whom it may concern:*

Be it known that I, WILLIAM P. WOOD, of Washington city, in the District of Columbia, have invented and made certain new and useful Improvements in the Method of Straining and Operating Saws; and I do hereby declare that the following is a full, clear, and exact description of the method of construction and mode of operating the same, reference being had to the accompanying drawings and making a part of this specification, in which—

Figure 1, is a perspective view of the apparatus complete, showing a fragment taken from the top of table the better to show the apparatus. B, B, B, an upright, or column; c, c, c, c, a recess or socket chamber; d, d, d, d, a metallic cap-piece having a facing, stay plate e, e, e, e; f, f, thickness or edges of the plate; g, g, sliding socket block; k, an adjusting screw tap or wrench screw nut; i, i, fulcra, or axes; h, a collar washer; J the elevating or straining screw; L, L, L, L, the rocking beams, with metal facings m, m, m, m, m, m; n, n, n, axis, or fulcrum boxes; o, o, o, o, mortises; p, p, pivots; q, q, q, q, centers of the beams or rocking arms; r, r, r, r, connecting rods, or coupling links; s, s, s, s, saw blades; t, t, the pitman or motion rod; u, the crank or eccentric motion wheel; w, w, the graduated reversible scale gage; x, x, the slide bolt of gage; y the journal boxes of the driving wheel z.

Fig. 2, shows the elevating device, or saw straining, socket block, with bevel sides a, a, the collar washer b, b, the axle c, the elevating screw J, J.

*Description.*—To enable others to be skilled in the use and application, and to make and construct my invention and improvements I herewith proceed to describe the construction and operation thereof, the nature and principles of which consist in constructing a saw table, stand or frame work, of any desired form; the diagram Fig. 7, showing a simple plan for light work, as A, A, A, A, A, and attaching thereto an upright beam, or vertical post, or column B, B, B, B, in which is formed, on the front side a recess, or socket chamber C, C, C. On the top end of this column, is screwed a metallic cap-piece d, d, d, having a front facing plate e, e, e, e, extending downward, over and let into, and on a level with the front of the upright B, B, B, and screwed thereto, or fastened in any secure manner. The edges f, f, of this plate, answer as a sliding surface for the beveled, adjustable sliding tension socket block g, g which is formed with a square body, with beveled sides, to prevent working, or forcing out of its place, shown in Fig. 2. This block or adjusting tension device, conforms in size to the recess C, C. Formed on this block, is fixed washer or collar h, and proceeding therefrom horizontally, is a stem, or axle, or the beam fulcrum i. From the upper part of this sliding socket tension block proceeds vertically a screw J, of desired length, fitted to which is a screw tap, or nut k, which may be made to work by hand, a wrench, key, or otherwise. Having thus formed the sawing table, or framing complete, I next have formed two beams or rocking arms L, L, L, L, L, necessarily of equal size, and exact length, arranged with metallic facings m, m, m, m. These beams or rocking arms, can be made of wood, or entirely of metal and hollow, if desired. Through each end of the rocking arms, at equal distances from the center or axis, are vertical mortices o, o, o, o, and transversely through these mortices are pivots p, p, p, p inserted. Midway of each rocking arm or beam, are centers q, q. The arm or beam No. 1, is hung on the movable or adjustable axis i, while the arm or beam, No. 2, is hung on a stationary or fixed axis i, formed on a plate which is screwed onto the upright or column B, B, B, or affixed in any suitable manner. Thus having given the principal features of the construction of my sawing apparatus, I next attach any ordinary saw blades, by the connecting rods r, r, r, r having eyes through which run the pivots p, p, p, p, passing through the ends of the arms or beams; thus forming a connection of the arms Nos. 1 and 2, with the saw blades s, s, s, s. This being complete, in order to set the saws in motion, all that is requisite is to form a connection by a vertical pitman or rod t, t, attached by a pivot, pin, or otherwise, to one end of the lower arm, or beam No. 2. This connection rod, is attached to a crank, or eccentric W, which may be set in motion by any gearing band, or other driving power.

The operation of my sewing machine is as follows. Being set in motion it will be perceived, that there is an alternating, or rocking motion of the ends of the arms or beams, which beams, being hung parallel to each other, on centers or axes, situated in the same vertical line, must necessarily give to each beam or arm the same corresponding play, and motion; and, though the ends of the arms describe the arc of a circle, the saw blades being of the same length, and hung or suspended on compensating pivots or swivel bearings $p, p, p, p$, which are at equal distances from the axles $i, i$, do not admit of any (supposed) variation laterally, from right to left. But on the contrary, by aid of the compensating pivots or swivel bearings, the saw blades have a direct vertical, or up and down play, or stroke; consequently, there can be no veering or lateral swaying in the cutting, which would make the kerf, or rift, irregular and rough. After the saw blades are attached as described; the straining or tightening of them both, is accomplished simultaneously, and equally, by screwing down the adjusting or elevating screw tap or nut $k$, which operation elevates, or screws up the tension, socket block $g, g, g$, upon which is hung the arm or beam No. 1. And thus is most effectually, and with regularity, accomplished the equable straining of two or more saw blades, by the aid of one simple appliance, and in one operation.

It may be well to remark, that a second set of arms or beams, and saws can be arranged opposite to each other, or upon each side of the upright, or column; thus making a double sawing apparatus, which can be operated by the same crank, or motion.

The many advantages possessed by my system of straining and operating saws, are as follows, viz. Simplicity, cheapness, and durability of construction; secondly, two or more saws may be set in motion, and double sawing carried on at the same time, without multiplying the resistance, or requiring double power to set the saws in motion; for it will be observed, that as the saw blade $s, x, s$, cuts downward, the other saw $s, y, s$, is going up, and doing no cutting. Then when the saw $s, x, s$, draws up, the saw $s, y, s$, is cutting downward; and thus sawing is done alternately; if two pieces of timber are being cut, or double sawing done at one operation of the machine. As the saw blades have a short play, or sweep, they must necessarily move quicker and consequently a greater number of cuts, and faster sawing done, even by the same motion than if the crank or eccentric, were made to describe a greater circle. Again, with my system of working saws, I am enabled to cut through a space much greater than, the extent, or mere distance of the stroke or sweep of each saw blade. Besides too, the danger of gumming or choking of the saws, is overcome readily, notwithstanding they move vertically; for as the blade cuts down, each tooth takes with it, its respective cutting, or particle, which, if not thrown out, or dislodged in the going down of the blade, must be detached as the blade goes up, and consequently every succeeding cut thereafter, pushes out the preceding chip or particle. Now, if the saw blade operated by my mode, moves only six inches, and each tooth should cut an inch, the whole number of inches six; but the timber or stuff to be cut through should be twelve inches; therefore it would appear, that as the saw moved only six inches, six inches of matter only could be detached, whereas such is not the case; for, if one part of the saw moves six inches, the whole length of the saw must move six inches through space or distance. Therefore, if the stuff or timber to be sawed should be twelve inches thick, twelve inches length of saw must cut. Then, in order to relieve the kerf, a rift of the detached particles, as the saw cuts down, six inches of matter or dust would escape clear, out of the kerf, and six inches would remain within the teeth of the last six inches of saw blade; but as the saw moves upward, the last six inches of detached matter is dislodged, in going up, and then as the saw descends again to make another cut, the last detached matter, is forced out, by the succeeding cut of the saw, and, consequently, though the actual cut or stroke, of the saw be less than the thickness of timber cut, still there is no danger of the saw blades choking, or the kerf or rift remaining clogged; unless the timber should be greater than the capacity or strength of saw blade.

It is found necessary under certain circumstances, in large saw mills, to hang the blades slightly from a vertical line, forward, or to lean them, thus to enable the ready escape of the chips or detached particles, and to afford what is termed the raking of the kerf. These features in the usual operation of saw mills I entirely do away with as described.

My saw mills are particularly well adapted to the use of cabinet, and architectural purposes, where scroll, or curvilinar sawing is required, or for mill and wheelwrights.

Connected to the upright B, B, B, is a reversible, adjustable, timber gage, which may have a regular inch scale, formed on it for convenience. This gage, when not in use, can be thrown up vertically against the column B, B, B, out of the way, or used for either saw when required.

Having given a full, clear, and accurate description of my system or mode of straining, and operating saws what I claim as new, and original with myself, and desire to secure by Letters Patent of the United States is as follows:

1. I claim attaching two saws to the opposite ends of two parallel rocking beams, by means of swivel bearings and in combination with the mode of straining substantially as described.

2. I also claim, in combination with the saw table, and upright, or column, the reversible graduated scale gage W W, as set forth.

WILLIAM P. WOOD.

Witnesses:
SAML. GRUBB,
E. G. HANDY.